United States Patent [19]
Lee et al.

[11] Patent Number: 5,932,635
[45] Date of Patent: *Aug. 3, 1999

[54] TACKIFIED PREPREG SYSTEMS

[75] Inventors: Jean Lee, Torrance; Albert Kuo, Cypress; Jack Douglas Boyd, San Clemente; Daniel Chang, Fullerton, all of Calif.

[73] Assignee: Cytec Technology Corp., Wilmington, Del.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/673,852

[22] Filed: Jul. 1, 1996

Related U.S. Application Data

[63] Continuation-in-part of application No. 08/126,012, Sep. 24, 1993, Pat. No. 5,532,296, which is a continuation of application No. 07/756,001, Sep. 6, 1991, abandoned, which is a continuation-in-part of application No. 07/738,006, Jul. 30, 1991, abandoned.

[51] Int. Cl.$^6$ .................................................. C08L 63/00
[52] U.S. Cl. ..................... 523/400; 523/427; 523/434; 523/436; 523/437; 523/438; 523/440
[58] Field of Search ................................... 523/400, 427, 523/434, 436, 437, 438, 440

[56] References Cited

U.S. PATENT DOCUMENTS

| | | |
|---|---|---|
| 3,018,290 | 1/1962 | Sauers et al. . |
| 3,018,292 | 1/1962 | Sauers et al. . |
| 3,448,079 | 6/1969 | Grigat et al. . |
| 3,536,734 | 10/1970 | Vegter et al. . |
| 3,553,244 | 1/1971 | Grigat et al. . |
| 3,627,780 | 12/1971 | Bonnard et al. . |
| 3,740,348 | 6/1973 | Grigat et al. . |
| 3,770,691 | 11/1973 | McLoughlin . |
| 3,839,358 | 10/1974 | Bargain . |
| 4,175,175 | 11/1979 | Johnson et al. . |
| 4,377,657 | 3/1983 | Street et al. . |
| 4,413,107 | 11/1983 | Locatelli . |
| 4,654,405 | 3/1987 | Jalbert et al. . |
| 4,740,552 | 4/1988 | Grant et al. . |
| 4,783,506 | 11/1988 | Gawin ..................... 525/109 |
| 4,863,787 | 9/1989 | Gawin ..................... 428/240 |
| 4,977,215 | 12/1990 | Gardner et al. ............ 525/119 |
| 4,977,218 | 12/1990 | Gardner et al. .......... 525/329.3 |
| 4,999,238 | 3/1991 | Gawin ..................... 428/283 |
| 5,003,018 | 3/1991 | Repecka . |
| 5,028,478 | 7/1991 | Odagiri et al. ............. 428/283 |
| 5,089,560 | 2/1992 | Gardner et al. ............ 525/109 |
| 5,169,710 | 12/1992 | Quareshi et al. .......... 428/246 |
| 5,364,700 | 11/1994 | Domeier .................. 428/394 |
| 5,532,246 | 7/1996 | Recker et al. ............. 523/400 |
| 5,557,831 | 9/1996 | Kishi et al. .................. 28/167 |
| 5,616,405 | 4/1997 | Kishi et al. ................ 442/60 |
| 5,626,916 | 5/1997 | Kishi et al. ............... 427/386 |
| 5,627,222 | 5/1997 | Recker et al. ............. 523/400 |
| 5,747,615 | 5/1998 | Repecka ................... 526/262 |

FOREIGN PATENT DOCUMENTS

| | | | |
|---|---|---|---|
| 0 252 725 | 1/1988 | European Pat. Off. | ........ C08G 63/00 |
| 0 274 899 | 7/1988 | European Pat. Off. | ........... C08J 5/24 |
| 0 351 027 | 1/1990 | European Pat. Off. | ........ C08L 13/00 |
| 0 351 028 | 1/1990 | European Pat. Off. | ........ C08L 63/00 |
| 0 441 047 | 12/1990 | European Pat. Off. | ...... C08L 101/00 |
| 0 486 044 A2 | 5/1992 | European Pat. Off. | ........ C08L 63/00 |
| 0 525 418 | 2/1993 | European Pat. Off. | ........ C08L 63/00 |
| 2 207 139 | 1/1989 | United Kingdom | ............ C08L 77/00 |

OTHER PUBLICATIONS

Bucknall and Partridge, British Polymer Journal, vol. 15, pp.71–75, Mar. 1983.

Drake et al., "Elastomer–Modified Epoxy Resins in Coating Applications", Epoxy Resin Chemistry II, Bauer Ed. ACS Symposium Series 221, pp. 1–20, 1983.

*Primary Examiner*—Edward J. Cain
*Attorney, Agent, or Firm*—Kristin H. Neuman; Michael J. Kelly; Claire M. Schultz

[57] ABSTRACT

Fiber-reinforced prepregs with superior tack containing thermosetting resin systems containing particulate, elastomers having a Tg of 25° C. and below, as well as the composites prepared therefrom are disclosed.

36 Claims, No Drawings

TACKIFIED PREPREG SYSTEMS

This is a continuation-in-part of application Ser. No. 08/126,012 filed Sep. 24, 1993, (which issued as U.S. Pat. No. 5,532,296 on Jul. 2, 1996), which in turn is a continuation of application Ser. No. 07/756,001, filed Sep. 6, 1991 (now abandoned) and which is a continuation-in-part of application Ser. No. 07/738,006, filed on Jul. 30, 1991, now abandoned.

BACKGROUND OF THE INVENTION

1. Field of the Invention

The present invention pertains to the field of fiber-reinforced thermosetting composites. The invention pertains to fiber-reinforced prepregs containing thermosetting resin systems containing particulate elastomers having a $T_g$ of 25° C. and below, and the composites prepared therefrom. In particular, the invention pertains to prepregs having crosslinked elastomer particles which improve the surface tack retention, thus providing for a prepreg system having improved tack quality.

2. Description of the Related Art

The use of fiber-reinforced thermoset composites continues to grow. While great strides have been made in increasing the strength, toughness, temperature use ceiling and other important physical properties, other improvement is still required. Although some resin systems, e.g., the bismaleimides, perform well in high temperatures, epoxy resin systems remain the system of choice for many applications. Cyanate ester systems are also preferred for some applications.

In practice, the lack of tack can be a severe limitation if the prepregs contain particles. This lack of tack has limited their use in many applications, especially in complex shaped composite parts. Many methods of increasing tack have been investigated. As a result of such investigations, numerous new resin monomers have been introduced into the market. However, despite initial expectations, the use of these new and often higher cost monomers has not resulted in the increase in tack desired in composites, especially if the resin system contains particles as part of the formulations.

Because of the requirements of the aerospace industry, most of the tackified prepregs described will have damage tolerance of greater than 138 MPa (20 Ksi), and in most cases greater than 172 MPa (25 Ksi) at 6.7 J/mm (1500 in-lb/in) impact level. In order to attain these damage tolerance levels, the rubber particle tackifying aid will be most advantageously used in combination with other particles, in the examples described either bismaleimide or engineering thermoplastic particles. The tackifier works by holding the resin on the prepreg surface.

Furthermore, engineered thermoplastics used to increase damage tolerance of the cured crosslinked network when formulating the toughening resins often present the problem in which the use of thermoplastic as interleaf tougheners causes poor tack retention on the resin surface. Additionally, the use of discrete, rigid thermoplastic particles causes an adverse effect in tack retention after the resin is transferred to the prepregs. "Resin soak-in", a phenomenon that occurs when the liquid resin drains through the fiber or the particles located on the surface of the prepreg, causes the tack to diminish significantly.

Soluble, reactive elastomers, have been used in epoxy adhesives, however, the addition of soluble elastomers to epoxies for use in fiber-reinforced composites results in a decrease in modulus, strength, and use temperature.

In copending U.S. application Ser. No. 08/126,012 filed on Sep. 24, 1993, which is a continuation of application Ser. No. 07/756,001 (now abandoned), which is a continuation-in-part of application Ser. No. 07/738,006, filed on Jul. 30, 1991, now abandoned, all of which applications are herein incorporated by reference, successful approaches to toughening epoxy resin matrices with respect to bismaleimides were disclosed. Nevertheless, in the past, there has been little success directed to toughened (impact resistant) epoxy resin matrices having superior tack, which as a practical sense, is of great importance in the industry because the industry is moving to more complex shaped parts.

In addressing tack, the formulation of, for example, bismaleimide resin using melt processing and solvent processing to produce the resin should be considered. Solvent processing offers the advantage of adjustable tack and viscosity by the use of the solvent. However, this process creates environmental hazards in production and handling and also requires sophisticated void control during the cure. In contrast, melt processing is solvent free, and can be achieved by two methods: a completely homogeneous resin melt system, or a slurry mixing system. The homogeneous system is highly viscous, however, it usually results in prepregs with inadequate tack and drape.

Inclusion of soft aliphatic segments into the backbone of the monomer systems has been attempted to improve tack. However, this procedure enhances the tack only to a minor extent by lowering the $T_g$ and the mechanical performance of the cured properties. Therefore, it is desirable to develop other effective tacky and tough resin systems which is able to maintain ultimate $T_g$ and the mechanical characteristics in the cured parts.

SUMMARY OF THE INVENTION

It has now been surprisingly discovered that thermosetting resin fiber-reinforced composites, preferably, toughened against impact induced damage, may be tackified by incorporation of a minor amount of preformed elastomer particles having a $T_g$ of less than 25° C. and a particle size of from about 0.1 μm to about 250 μm, preferably from about 0.1 μm to about 100 μm into the uncured matrix resin system of the fiber-reinforced prepregs used to prepare such composites. The amount of elastomer, a known toughening additive, may be non-toughening but still an amount effective to induce tack. Preferably, the base resin system (less the elastomer) having superior tack-qualities is capable of producing a composite having a compression strength after impact (CAI) of 70 MPa (10 Ksi) or more at 6.7 J/mm (1500 in-lb/in).

In another embodiment, this invention is directed to a tackified thermosetting matrix resin system, comprising A) a base resin system comprising (1) one or more thermosetting resin monomers selected from the group consisting of the bismaleimide resins, epoxy resins, cyanate resins, and mixture thereof and (2) optionally, comonomers, curing agents, catalysts, and/or dissolved thermoplastics having a $T_g$ greater than 100° C. from about 1 to about 20 weight percent, preferably from about 2 to about 15 weight percent of the total resin system; B) from about 1 percent to about 10 percent by weight of a tack inducing amount of a lightly crosslinked elastomer having a $T_g$ of less than 25° C., and a particle size of from about 0.1 μm to about 250 μm, preferably from about 0.1 μm to about 100 μm; and C) a toughening amount of particulate engineering thermoplastics in an amount of from about 2 to about 40 weight percent, preferably from about 5 to about 30 weight percent based on the weight of the total resin system.

In yet another embodiment, this invention is directed to a process for preparing a toughened thermosetting matrix resin system having superior tack comprising slurry mixing A) a base resin system comprising (1) a functional monomer, (2) a liquid comonomer; and (3) optionally, a dissolved thermoplastic having a $T_g$ greater than 100° C. from about 1 to about 20 weight percent, preferably from about 2 to about 15 weight percent of the total resin system; B) from about 1 percent to about 10 percent by weight of a tack inducing amount of a lightly crosslinked elastomer having a $T_g$ of less than 25° C. and a particle size of from about 0.1 $\mu$m to about 250 $\mu$m, preferably from about 0.1 $\mu$m to about 100 $\mu$m; and C) a particulate engineering thermoplastic in an amount of from about 2 to about 40 weight percent, preferably from about 5 to about 30 weight percent based on the weight of the total resin system.

DESCRIPTION OF THE PREFERRED EMBODIMENTS

The base resin systems useful in the subject invention are derived from thermosetting resins including but not limited to bismaleimide resins, cyanate resins and epoxy resins.

Bismaleimide resins are heat-curable resins containing the maleimido group as the reactive functionality. The term bismaleimide as used herein includes mono-, bis-, tris-, tetrakis-, and higher functional maleimides and their mixtures as well, unless otherwise noted. Bismaleimide resins with an average functionality of about two are preferred. Bismaleimide resins as thusly defined are prepared by the reaction of maleic anhydride or a substituted maleic anhydride such as methylmaleic anhydride, with an aromatic or aliphatic di- or polyamine. Examples of the synthesis may be found, for example, in U.S. Pat. Nos. 3,018,290, 3,018,292, 3,627,780, 3,770,691, and 3,839,358. The closely related nadic imide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein and in the claims, the term bismaleimide shall include the nadicimide resins.

Preferred di- or polyamine precursors include aliphatic and aromatic diamines. The aliphatic diamines may be straight chain, branched, or cyclic, and may contain heteroatoms. Many examples of such aliphatic diamines may be found in the above cited references. Especially preferred aliphatic diamines are hexanediamine, octanediamine, decanediamine, dodecanediamine, and trimethylhexanediamine.

The aromatic diamines may be mononuclear or polynuclear, and may contain fused ring systems as well. Preferred aromatic diamines are the phenylenediamines; the toluenediamines; the various methylenedianalines, particularly 4,4'-methylenedianiline; the napthalenediamines; the various amino-terminated polyarylene oligomers corresponding to or analogous to the formula $H_2N$-Ar[X-Ar]$_n NH_2$, wherein each Ar may individually be a mono- or poly-nuclear arylene radical, each X may individually be —O—, —S—, —CO$_2$—, —SO$_2$—, —O—CO—, $C_1$–$C_{10}$ lower alkyl, $C_1$–$C_{10}$ halogenated alkyl, $C_2$–$C_{10}$ lower alkyleneoxy, aryleneoxy, polyoxyalkylene or polyoxyarylene, and wherein n is an integer of from about 1 to 10; and primary aminoalkyl terminated di- and polysiloxanes. Particularly useful are bismaleimide "eutectic" resin mixtures containing several bismaleimdes. Such mixtures generally have melting points which are considerably lower than the individual bismaleimides. Examples of such mixtures may be found in U.S. Pat. Nos. 4,413,107 and 4,377,657. Several such eutectic mixtures are commercially available.

Cyanate resins are heat-curable resins whose reactive functionality is the cyanate, or -OCN group. These resins are generally prepared by reacting a di- or poly-functional phenolic compound with a cyanogen halide, generally cyanogen chloride or cyanogen bromide. The method of synthesis by now is well known to those skilled in the art, and examples may be found in U.S. Pat. Nos. 3,448,079, 3,553,244, and 3,740,348. The products of this reaction are the di- and polycyanante esters of the phenols.

The cyanate esters prepolymers useful in the compositions of the subject invention may be prepared by the heat treatment of cyanate functional monomers either with or without a catalyst. The degree of polymerization may be followed by measurement of the viscosity. Catalysts may be used to assist the polymerization. Such prepolymers and catalysts are known in the art.

Suitable cyanate resins are commercially available and may be prepared from mono-, di-, and polynuclear phenols, including those containing fused aromatic structures. The phenols may optionally fused aromatic structures. The phenols may optionally be substituted with a wide variety of organic radicals including, but not limited to halogen, nitro, phenoxy, acyloxy, acyl, cyano, alkyl, aryl, alkaryl, cycloalkyl, and the like. Alkyl substituents may be halogenated, particularly perchlorinated and perfluorinated. Particularly preferred alkyl substituents are methyl and trifluoromethyl.

Particularly preferred phenols are the mononuclear diphenols such as hydroquinone and resorcinol; the various bisphenols, such as bisphenol A, bisphenol F, and bisphenol S; the various dihydroxynapthalenes; and the oligomeric phenol and cresol derived novolacs. Substituted varieties of these phenols are also preferred. Other preferred phenols are the phenolated dicyclopentadiene oligomers prepared by the Friedel-Crafts addition of phenol or a substituted phenol to dicyclopentadiene as taught in U.S. Pat. No. 3,536,734.

The use of slurry mixing in this invention is beneficial. The term slurry mixing refers to a method for obtaining in a simple and expedient manner homogeneous heat curable resin systems by combining one or more monomers with other resin system components, preferably at lower temperatures than otherwise would be required to affect solubility of these components. Slurry mixing uniquely combines the advantages of suitable resin viscosity and tack characteristics without the involvement of solvents. This method is disclosed in U.S. Pat. No. 5,003,018, which is incorporated herein by reference.

As another embodiment, epoxy resins may also be utilized alone or as comonomers in the cyanate functional or bismaleimide functional resin systems of the subject invention. Epoxy resins are thermosetting resins containing the oxirane, or epoxy group, as the reactive functionality. The oxirane group may be derived from a number of diverse methods of synthesis, for example by the reaction of an unsaturated compound with a peroxygen compound such as peracetic acid; or by the reaction of epichlorohydrin with a compound having an active hydrogen, followed by dehydrohalogenation. Methods of synthesis are well known to those skilled in the art, and may be found, for example, in the Handbook of Epoxy Resins, Lee and Neville, Eds., McGrawHill, ©1967, in chapters 1 and 2 and in the references cited therein.

The epoxy resins useful in the practice of the subject invention are generally those that are commercially available and substantially di- or polyfunctional resins. In general, the functionality should be from about 1.8 to about 8. Many such resins are available commercially. Particularly useful are the epoxy resins which are derived from epicholorohydrin. Examples of such resins are the di- and polyglycidyl derivatives of the bisphenols, such as bisphenol A, bisphenol F, and bisphenol S; the dihydroxynaphthalenes, for example 1,4-, 1,6-, 1,7-, 2,5-, 2,6-, and 2,7-dihydroxynaphthalenes; 9,9-bis[4-hydroxyphenyl]fluorene; the phenolated and cresolated monomers and oligomers of dicyclopentadiene as taught by U.S. Pat. No. 3,536,734; the aminophenols, particularly 4-aminophenol; various amines such as 4,4'-. 1,4'-, and 3,3'-methylenedianiline and analogs of methylenedianiline in which the methylene group is replaced with a $C_1$–$C_4$ substituted or unsubstituted lower alkyl, or —O—, —S—, —CO—, —O—CO—, —O—CO—O—, —SO$_2$-, or aryl group; and both amino, hydroxy, and mixed amino and hydroxy terminated polyarylene oligomers having —O—, —S—, —CO—, —O—CO—, —O—CO—O—, —SO$_2$-, and/or lower alkyl groups interspersed between mono or polynuclear aryl groups as taught in U.S. Pat. No. 4,175,175.

Also suitable are the epoxy resins based on the cresol and phenol novolacs. The novolacs are prepared by the condensation of phenol or cresol with formaldehyde, and typically have more than two hydroxyl groups per molecule. The glycidyl derivatives of the novolacs may be liquid, semisolid, or solid, and generally have epoxy functionalities of from 2.2 to about 8.

Hybrid resin systems are also a part of this invention. Suitable hybrid resin systems include the combination of bismaleimide and cyanate ester comonomers, epoxy and cyanate ester comonomers, and bismaleimide and epoxy comonomers, and the mixture thereof.

The various cyanate resin systems useful in the subject invention contain an excess of about 70 weight percent of cyanate functional monomers, oligomers, or prepolymers, up to about 25 weight percent of bismaleimide comonomer, and up to about 10 weight percent of epoxy comonomer, together with from 0.0001 to about 5.0 weight percent catalyst, and optionally, up to about 10 percent by weight of engineering thermoplastic. In addition to these components, individual formulations may require the addition to these components, individual formulations may require the addition of minor amounts of fillers, etc.

It is preferred that the resin system chosen have a base resin CAI of greater than 70 MPa (10 Ksi). By this it is meant that the base resin, less low $T_g$ elastomer particles, and not including particulate thermoplastics, when used to impregnate intermediate modulus unidirectional carbon fibers, and then consolidated into a quasiisotropic panel in accordance with Boeing Support Specification BSS 7260 will have a compression strength after 6.7 J/mm (1500 in-lb/in) impact of 70 MPa (10 Ksi) or more. Although this test of damage tolerance is measured on intermediate modulus fibers, it should be emphasized that the resin systems, having met this test, may be utilized with any reinforcing fibers including but not limited to high and standard modulus as well as intermediate modulus carbon fibers.

The particulate modifiers employed in the practice of this invention to increase prepreg tack may be characterized as comprising preformed, low $T_g$ particles, and more particularly as being a finely-divided, partially cross-linked rubber.

The particles are further characterized as being partially crosslinked, meaning that the rubber particles will exhibit sufficient integrity to resist being solubilized appreciably at temperatures that will normally be encountered during the mixing, fabricating and curing of the laminate. Such rubber particles will be dispersed in the matrix resin without dissolving or otherwise losing their particulate character. Rubbers having glass transition temperatures below 25° C., preferably below 0° C. are suitable.

Suitable rubbers include conventional diene and olefin rubbers having, or modified to include, from about 0.1 to about 5 weight percent, preferably from about 0.5 to about 3 weight percent carboxyl, carboxamide, anhydride, epoxy, amine, hydroxy or unsaturated functionality. The particular functional groups preferred are capable of reacting with at least one of the resin system monomers. Representative of such diene rubbers are the variety of well known partially cross-linked copolymers of butadiene or isoprene including for example the diene-acrylonitrile copolymers widely available as nitrile rubbers, copolymers of vinyl aromatic monomers and diene monomers such as the styrene-butadiene copolymers known as SBR rubbers, and terpolymers of dienes with acrylonitrile and styrene or vinyl toluene, all of which, when modified with the desired level of functionality, may be described as diene rubbers. Many such rubbers having $T_g$ values below 25° C. and preferably below 0° C. and the desired functionality are readily available from commercial sources. Also useful are rubbery copolymers of acrylate esters with carboxyl functionality, which may be described as carboxylated acrylic rubbers. Acrylic rubbers with the desired level of carboxylic functionality and having $T_g$ values in the range of −25° C. to 10° C. are also commercially available in a variety of forms. Other polymers which may be similarly modified to include carboxyl or other functionality include rubbery copolymers and particularly graft copolymers of styrene, vinyltoluene or the like and optionally one or more additional copolymerizable vinyl monomers on a rubbery polymeric substrate, using a sufficiently high level, preferably greater than 60 weight percent, of the rubbery substrate component. Specific examples include rubbery acrylonitrile-butadiene-styrene (ABS) polymers, methylmethacrylate-butadiene-styrene (MABS) and modified silicone rubber polymers and the like.

Modification of rubbers to include carboxyl functionality may be accomplished by a variety of well known processes, including copolymerizing the rubber monomers with a suitable copolymerizable carboxylic monomer or by grafting the preformed rubber in solution, suspension, or latex form, with carboxylic compounds such as maleic anhydride, maleimide, acrylic acid, itaconic acid or the like. Other methods for providing carboxylated rubbery polymers having the necessary character include grafting the polymers in particle form with mixtures of a monomer and a copolymerizable carboxylic or other functional unsaturated compound to provide particles having a relatively rigid outer shell with reactive carboxylic or other functionality, and many such core-shell particulate modifiers are also known and commercially available. Also suitable are post reaction processes for functionalizing rubbery diene copolymers, olefin rubbers and the like, as recently described in U.S. Pat. Nos. 4,740,552 and 4,654,405, which are incorporated herein by reference.

The rubbers suitable for use as rubber particles according to the practice of this invention may thus be described as rubbers having a $T_g$ less than 25° C. which may be selected from the group of diene rubbers, acrylic rubbers, and mixtures thereof.

The rubber particles may be solid, porous or hollow and take any convenient shape, and may for example be formed into bead-like spheres or oblate spheroids from solutions, dispersions or suspensions of the rubber by a variety of processes including spray drying, flash evaporation, precipitation, coagulation or the like. The particles may also be produced from bulk material by a pulverizing or grinding process, optionally under cryogenic conditions, to provide particles rough and irregular in shape. Suitable particles may also be formed by coating a rubber onto a particulate support having the appropriate size then partially cross-linking the carboxylated rubber coating. For example, SAN and polyolefin resins, as well as SBR, nitrile rubber and the like are available as particles in the form of a latex, suspension or dispersion. Such particles may be coated individually with a rubber together with appropriate curing additives, cured to form a cross-linked coating on the individual particles, then collected in particle form by a spray-drying operation or the like.

Particle size may be determined by carefully preparing a suspension of the particles. The suspension is best if it is prepared in the same way as the resin only omitting other particles. The resin must be sheared during mixing to break up the agglomerates. Then the resin is coated onto a glass slide to about 50 $\mu$m thick. The slide is examined randomly and the particles measured.

The particle size of the elastomers should be in the range of about 0.1 $\mu$m to about 250 $\mu$m, preferably from about 0.1 $\mu$m to about 100 $\mu$m. The smallest particles range from about 0.1 $\mu$m to about 2 $\mu$m in size, the largest particles range from about 200 $\mu$m to about 250 $\mu$m, and the greatest portion of particles range from about 10 $\mu$m to about 50 $\mu$m. The weight percentage of elastomer in the resin system is most minor, generally being from about 1 to about 10 percent by weight. Amounts of from 2 weight percent to 8 weight percent have been found to be particularly useful for preparing tackified prepregs.

In mixing the resin system ingredients and particulate elastomer, care should be taken to assure that the low $T_g$ preformed elastomer particles remain in particulate form, i.e., no appreciable solution into the resin system components takes place. This can ordinarily be achieved under normal resin mix conditions, although with some elastomers, the mixing temperature or time may have to be carefully controlled. Such modifications to normal mix conditions are within the level of skill in the art. Light crosslinking of the rubber particles facilitates this requirement.

The resin systems of the subject invention further contain a particulate engineering thermoplastic. Such thermoplastics have high strength and glass transition temperatures above 150° C., preferably above 200° C. The particulate thermoplastic or mixture may be a polyimide, polyetherimide, polyethersulfone, polysulfone, polyetherketone, polyamide, polyamideimide, or the like. Suitable amounts are from about 2 to about 40 percent by weight, and preferably about 5 to about 30 percent by weight. Preferably, the particulate thermoplastic may be described as differentially soluble. Such thermoplastics have a relatively steep rate of solution versus temperature, and may easily be maintained in particulate form during resin mixing and prepregging, but may dissolve upon cure. A thermoplastic may be tested for its differential solubility by simple tests, for example by mixing the requisite amount of thermoplastic particles with the remaining system components at the mix temperature, followed by heating to the cure temperature for a short time while stirring. At the mix temperature, the greatest amount of thermoplastic particles should not dissolve, but remain in particulate form.

Soluble thermoplastics may also be utilized. Such thermoplastics are generally added in relatively minor amounts, from about 1 to about 20 weight percent, preferably from about 2 to about 15 weight percent of the total resin system. Higher amounts of dissolved thermoplastic generally leads to undesirable increases in the uncured resin viscosity, which may partially be compensated by use of base resin system components, i.e., the epoxy, bismaleimide, or cyanate monomers, with lower viscosity. Addition of lower amounts of dissolved thermoplastic, i.e., from about 1 to about 20 percent by weight, will often assist the toughness of the system. Further, when lower amounts of dispersed particulate thermoplastic is utilized, the addition of dissolved thermoplastic can sometimes alter the solvent character of the matrix in such a manner that particulate thermoplastics which are normally too soluble, may in the presence of the dissolved thermoplastic, exhibit the desirable differential solubility alluded to earlier.

The preformed, low $T_g$, elastomers are generally added at temperature between 50° C. and 150° C., for example at about 100° C. If particulate thermoplastics are utilized, they may be added at this time also. However, when dissolved thermoplastics are utilized, they are normally added prior to addition of the elastomer. In some cases, it may also prove to be advantageous to prereact the elastomeric particles with the matrix resin at elevated temperatures for an extended period of time, for example 30 to 150 at 100° C. to 150° C. The chemical reaction between the functional groups of the elastomer and the matrix resin can optionally be accelerated by the use of a suitable catalyst. It should be noted, however, that the particulate tackifying elastomer must not dissolve under these conditions, but must remain in particulate form. Such prereaction is believed to assist in promoting adherence of the tackifying low $T_g$ rubber particles to the resin matrix.

When use as matrix resins for fiber-reinforced prepregs is contemplated, the fiber reinforcement may be in the form of a random nonwoven mat, a woven textile, or unidirectional tows or tape, or combination thereof. The fibers utilized may be high melting organic fibers or inorganic fibers.

Examples of high melting organic fibers are the high temperature polyolefin, polyetherketone (PEK) and similar fibers; all aromatic polyamides, or aramid fibers; and the like. Preferably, however, inorganic fibers such as glass quartz, carbon (and graphitic modifications), silicone carbide, boron nitride, ceramic, and the like are utilized. The matrix resins of the subject invention demonstrate their tackifying effect best when utilized with carbon fibers, for example, intermediate, standard and high modulus carbon fibers.

Curing of the prepregs of the subject invention utilize conventional cure temperatures and cure cycles. Bismaleimide systems are generally cured under modest autoclave pressure at elevated temperatures. In the Examples, prepregs were made using intermediate modulus fibers at 145 g/m² areal fiber weight with 35% nominal resin content. $T_g$, the glass transition temperature, relates to the softening point of the cured resin, and demonstrates whether there is a change in the degree of cure of the resins as they are associated with tackifiers. The test specimens for $T_g$ measurement, using a DuPont 983 Dynamic Mechanical Analyzer, were cut from panels of 12 plies stacked tape with the same fiber orientation.

While it is apparent that the invention disclosed is well calculated to describe the invention stated above, it should be appreciated that numerous modifications and embodi-

EXAMPLE 1—COMPARATIVE

A resin composition was prepared as follows: 10 parts (w/w) of bismaleimide of 4,4'-diaminodiphenylmethane (MDA-BMI)and 10 parts (w/w) bismaleimide of toluene diamine (TDAB) were dissolved into 30.4 parts of 2,2'-diallylbisphenol A (DABA) at 121° C. After the mixture had cooled, 25.6 parts of the preground MDA-BMI/TDAB mixture with particle size of approximately 3 microns were slurried in about 82° C. at 1:1 weight ratio. This was followed by the addition of 4 parts resorcinol diglycidyl ether (RDGE) and 20 parts of a preground aromatic imide polymer thermoplastic with particle size of 18 microns. The resultant prepregs had substantially no tack. It was subsequently laid up into a quasiisotropic panel and tested for CAI at an impact level of 6.7 J/mm (1500 in-lb/in). The cure cycle was 2 hours at 191° C. followed by 4 hours at 204° C. The panel exhibited a CAI of 310 MPa and the $T_g$ was 255° C.

EXAMPLE 2

To the resin system of Example 1 was added 2 weight percent of a crosslinked acrylonitrile/butadiene elastomer having $T_g$ of about −15° C. The resultant prepreg surface was effectively tacky. The tack life of the resultant prepregs was 5 to 7 days. The panel exhibited a CAI of 310 MPa and a $T_g$ of 255° C.

EXAMPLE 3—COMPARATIVE

Procedure similar to the above examples for preparing prepreg was used. Epoxy monomers comprising 25 parts by weight of diglycidyl ether of bisphenol F, 18 parts by weight of triglycidyl ether of p-aminophenol were dissolved in 5 parts by weight of a dissolved thermoplastics. 18 Parts by weight of glycidyl ether of phenolated dicyclopentadiene were then added. 15 Parts by weight of a polyimide particulate engineering thermoplastic for providing an energy absorbing layer were added by slurry mixing at low temperature at 82° C. As a curing agent, 21 parts by weight of 3,3-diaminodiphenyl sulfone was used. No rubber particles as tackifier were used. The resultant prepreg lost substantially all tackiness in 2 to 3 days. A panel produced therefrom had a CAI of 299.3 MPa after 177° C. (350° F.) with 2 hours of curing.

EXAMPLE 4

The procedure of Example 3 using epoxy monomers was repeated, 2 parts by weight of a crosslinked acrylonitrile/butadiene elastomer were used. The resultant panel exhibited a CAI at the same level as Example 3 of 298.6 MPa and the prepregs had a highly pronounced tack surface for 7 days. Thus, the elastomer particles provide tack but no damage tolerance variation.

EXAMPLE 5

A procedure similar to the above examples for preparing prepreg was used. 8 Parts by weight of a polyether sulfone thermoplastic were dissolved in 70 parts by weight of a mixture of liquid and semi-solid cyanate ester monomers. 2 Parts by weight of a partially crosslinked nitrile elastomer was added to the dissolved cyanate ester monomer-thermoplastic mixture. 20 Parts by weight of a polyimide particulate engineering thermoplastic were incorporated by slurry mixing. 0.15 Phr of copper acetylacetonate predissolved in nonylphenol was used as a catalyst. The resultant prepreg exhibits a CAI of 295.5 MPa and an effective, tacky surface.

What is claimed is:

1. A tackified thermosetting matrix resin system, comprising:
   A. a base resin system comprising
      (1) one or more thermosetting resin monomers selected from the group consisting of bismaleimide resins, epoxy resins, cyanate resins, and mixtures thereof; and
      (2) optionally, comonomers, curing agents, catalysts, and/or dissolved thermoplastics having a $T_g$ greater than 100° C.;
   B. a non-toughening and tack inducing amount of a lightly crosslinked particulate elastomer having a $T_g$ of less than 25° C.; and
   C. A particulate engineering thermoplastic in an amount of from about 2 to about 40 weight percent based on the total resin system.

2. The resin system of claim 1 wherein said elastomer has a $T_g$ of less than 0° C.

3. The resin system of claim 1 wherein said elastomer contains carboxyl, carboxamide, epoxy, amine, anhydride, hydroxy or unsaturated functionality.

4. The resin system of claim 1 containing from about 1 weight percent to about 20 weight percent of a dissolved thermoplastic.

5. The resin system of claim 1 containing from about 5 weight percent to about 30 weight percent of a particulate engineering thermoplastic.

6. The resin system of claim 1 wherein said particulate thermoplastic is a differentially soluble thermoplastic.

7. A process for preparing a tackified toughened thermosetting matrix resin system comprising slurry mixing
   A. a base resin system comprising
      (1) functional monomers; and
      (2) optionally, a dissolved thermoplastic having a $T_g$ greater than 100° C.;
   B. a nontoughening and tack inducing amount of a lightly crosslinked particulate elastomer having a $T_g$ of less than 25° C.; and
   C. a particle engineering thermoplastic in an amount of from about 2 to about 40 weight percent based on the total resin system.

8. The process of claim 7 wherein said functional monomer comprises a bismaleimide.

9. The process of claim 7 wherein said functional monomer comprises a cyanate ester.

10. The process of claim 7 wherein said functional monomer comprises an epoxy group.

11. The process of claim 7 wherein said elastomer has a $T_g$ of less than 0° C.

12. The process of claim 7 wherein said elastomer contains carboxyl, carboxamide, epoxy, amine, anhydride, hydroxy or unsaturated functionality.

13. The process of claim 7 wherein said resin system contains from about 1 weight percent to about 20 weight percent of a dissolved thermoplastic.

14. The process of claim 7 wherein said resin system contains from about 5 weight percent to about 30 weight percent of a particulate thermoplastic.

15. The process of claim 7 wherein said particulate thermoplastic is a differentially soluble thermoplastic.

16. The resin system of claim 1 wherein said non-toughening and tack inducing amount is about 1 percent to about 10 percent by weight relative to the total system weight.

17. The process of claim 7 wherein said non-toughening and tack inducing amount is about 1 percent to about 10 percent by weight relative to the total system weight.

18. The resin system of claim 1 wherein said non-toughening and tack inducing amount is 2 percent to about 8 percent by weight relative to the total system weight.

19. The process of claim 7 wherein said non-toughening and tack inducing amount is 2 percent to about 8 percent by weight relative to the total system weight.

20. The resin system of claim 1 wherein said non-toughening and tack inducing amount is about 2 percent by weight relative to the total system weight.

21. The process of claim 7 wherein said non-toughening and tack inducing amount is about 2 percent by weight relative to the total system weight.

22. The resin system of claim 1 wherein said elastomer is a non-functionalized elastomer.

23. The process of claim 7 wherein said elastomer is a non-functionalized elastomer.

24. The resin system of claim 1 wherein said dissolved thermoplastic is present in the amount of about 2 to about 15 percent by weight relative to the total system weight.

25. The process of claim 7 wherein said dissolved thermoplastic is present in the amount of about 2 to about 15 percent by weight relative to the total system weight.

26. The resin system of claim 1 wherein said elastomer has a particle size of from about 0.1 $\mu$m to about 250 $\mu$m.

27. The resin system of claim 1 wherein said elastomer has a particle size of about 0.1 $\mu$m to about 100 $\mu$m.

28. The process of claim 7 wherein said elastomer has a particle size of from about 0.1 $\mu$m to about 250 $\mu$m.

29. The process of claim 7 wherein said elastomer has a particle size of from about 0.1 $\mu$m to about 100 $\mu$m.

30. The resin system of claim 1 with the proviso that when the thermosetting resin monomer is a bismaleimide resin, and a comonomer is present in the system, and the comonomer is an alkenylphenol, then the elastomer has a $T_g$ of less than 25° C., but greater than 10° C.

31. The resin system of claim 1 with the proviso that when the thermosetting resin monomer is a bismaleimide resin, and a comonomer is present in the system, and the comonomer is an alkenylphenol, then the elastomer has a particle size of from about 0.1 $\mu$m to 2 $\mu$m, or from 70 $\mu$m to about 250 $\mu$m.

32. An improved toughened thermosetting matrix resin system, comprising a base resin system comprising one or more thermosetting resin monomers selected from the group consisting of the bismaleimide resins, epoxy resins, cyanate resins, and mixtures thereof, wherein said matrix resin system is toughened by the addition of particulate engineering thermoplastic, the improvement being the addition of a non-toughening and tack inducing amount of a lightly crosslinked particulate elastomer having a $T_g$ of less than 25° C.

33. An improved fiber-reinforced thermosettable prepreg comprising fibrous material reinforcement and the matrix resin system of claim 1.

34. An improved fiber-reinforced thermosettable prepreg comprising fibrous material reinforcement and the matrix resin system of claim 30.

35. An improved fiber-reinforced thermosettable prepreg comprising fibrous material reinforcement and the matrix resin system of claim 31.

36. An improved fiber-reinforced thermosettable prepreg comprising fibrous material reinforcement and the matrix resin system of claim 32.

* * * * *